VAN WYCK A. CROSHIER.
AUTOMATIC CUT-OFF.
APPLICATION FILED MAR. 4, 1908.
921,953.
Patented May 18, 1909.
2 SHEETS—SHEET 1.
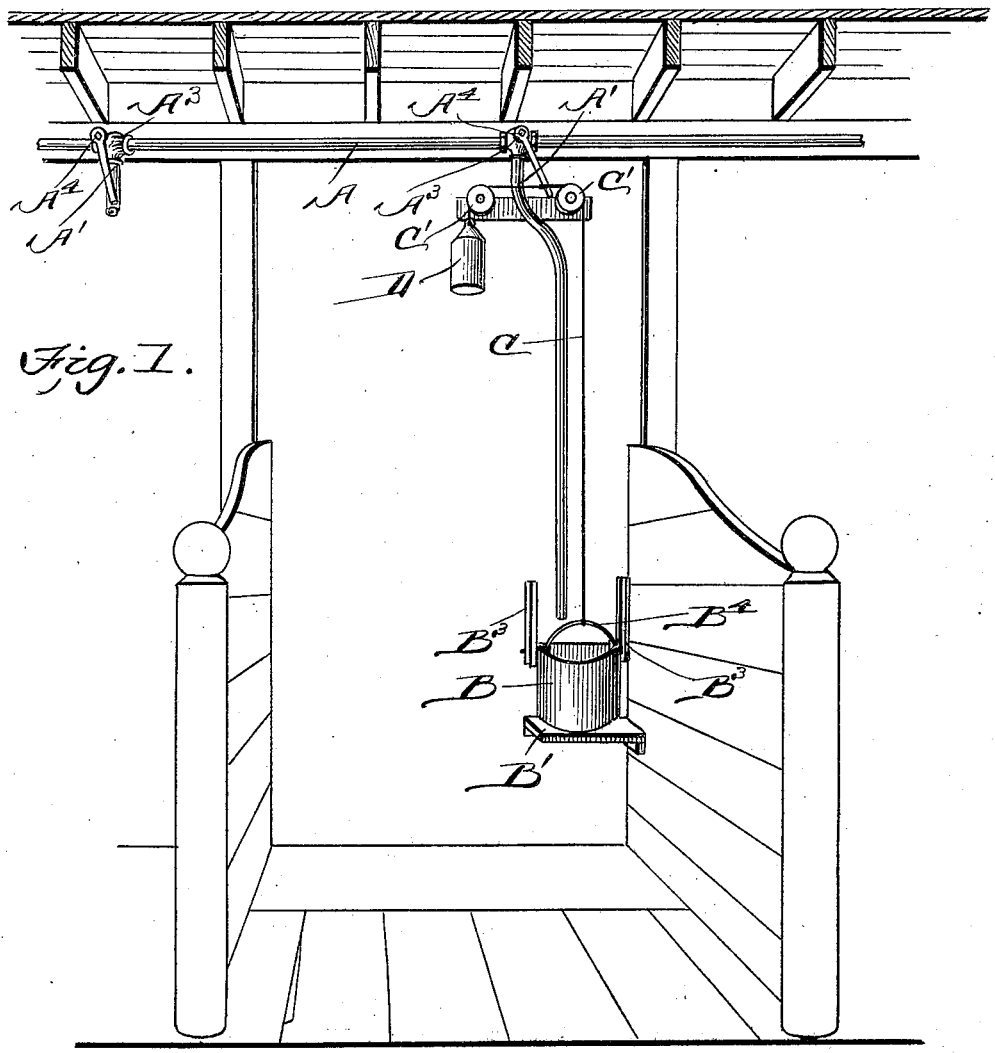
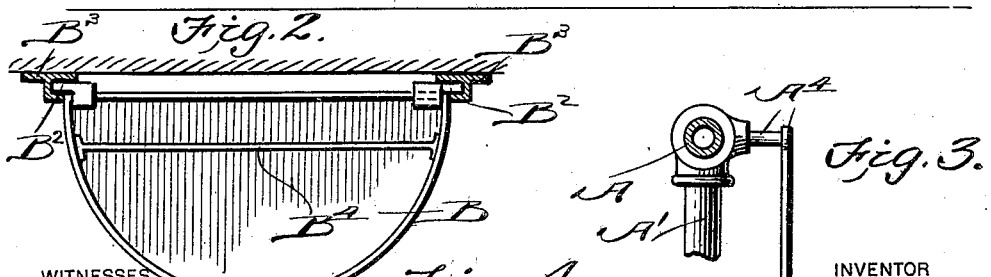
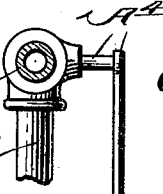
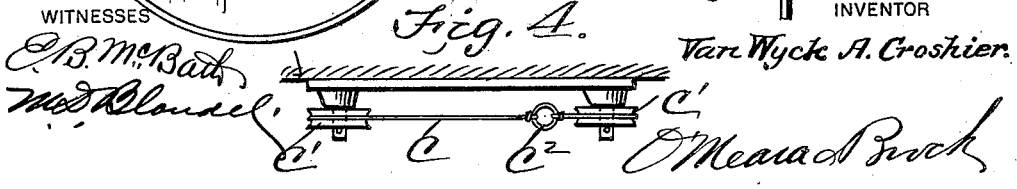
WITNESSES
INVENTOR
Van Wyck A. Croshier.

VAN WYCK A. CROSHIER.
AUTOMATIC CUT-OFF.
APPLICATION FILED MAR. 4, 1908.
921,953.
Patented May 18, 1909.
2 SHEETS—SHEET 2.
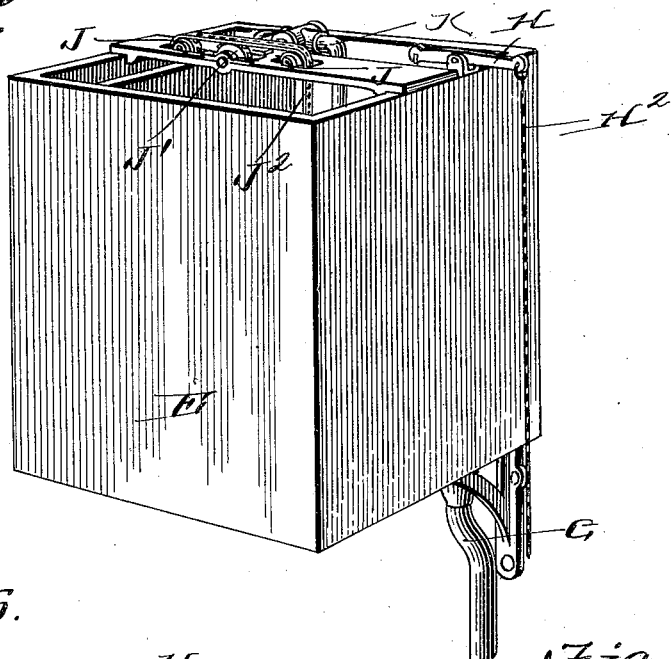
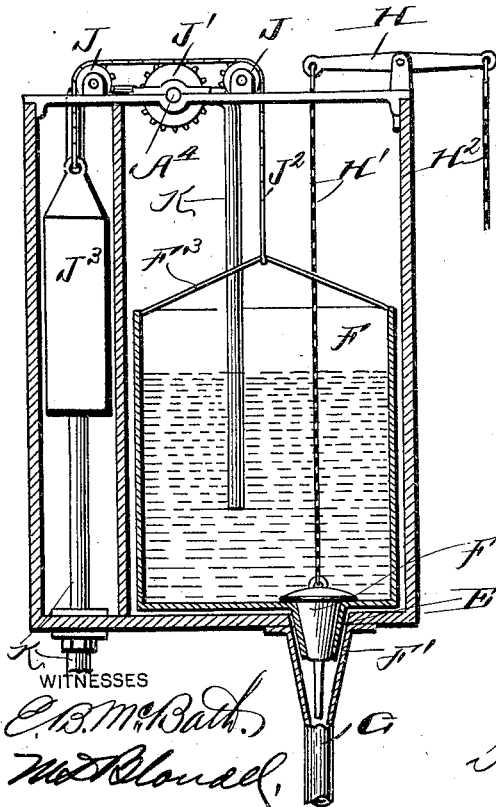
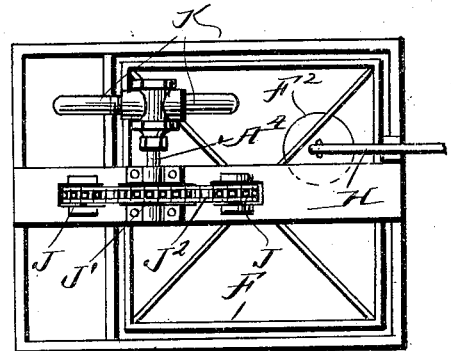
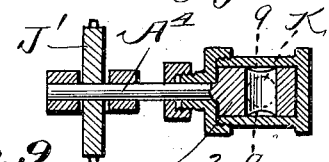

UNITED STATES PATENT OFFICE.

VAN WYCK A. CROSHIER, OF CHICAGO, ILLINOIS.

AUTOMATIC CUT-OFF.

No. 921,953.  Specification of Letters Patent.  Patented May 18, 1909.

Application filed March 4, 1908. Serial No. 419,203.

*To all whom it may concern:*

Be it known that I, VAN WYCK A. CROSHIER, a citizen of the United States, residing at Chicago, in the county of Cook and State of Illinois, have invented a new and useful Improvement in Automatic Cut-Offs, of which the following is a specification.

This invention is an improvement in automatic cut-offs, and is designed especially for use in regulating the feed of water through a supply or flush pipe.

The object of the invention is to feed a predetermined amount of water or other liquid into a suitable receptacle from a source of supply and to automatically cut-off the flow when the required amount has been delivered to the said receptacle.

The invention consists of a receptacle adapted to receive water and capable of a vertical movement, of means for vertically moving the receptacle when the amount of water therein has been decreased below certain limits, and a valve controlling the source of supply and provided with a stem operable for the purpose of closing the valve upon vertical movement of the receptacle in one direction, and automatically operable to close the valve upon movement of the receptacle in the opposite direction.

In the drawings forming a part of this specification:—Figure 1 is a perspective view showing the application of my invention in connection with the watering of stock. Fig. 2 is a top plan view of the receptacle shown in Fig. 1. Fig. 3 is a sectional view through a main supply pipe showing a valve stem in elevation. Fig. 4 is a plan view of certain means for engaging and operating said stem. Fig. 5 is a detail perspective view illustrating a flush tank having my invention applied thereto. Fig. 6 is a vertical section through said tank, and through the vertically movable receptacle arranged thereon. Fig. 7 is a plan view of the parts shown in Fig. 6. Fig. 8 is a detail sectional view through a valve, valve casing, and sprocket wheel, a rotatable valve stem being shown in plan. Fig. 9 is a transverse section through the valve on the line 9—9 of Fig. 8.

In these drawings A represents a water supply pipe which I have shown arranged above stalls in a stable, the said pipe being provided with branches A', extending downwardly. The supply of water to each of these branches is controlled by a one-way valve $A^2$ arranged in a suitable valve casing $A^3$. Each branch pipe A' discharges into a suitable water receptacle B, which rests upon a suitable platform B' and in the form shown in Figs. 1 and 2 I have shown the receptacle B as semi-cylindrical in shape and open at the top, and provided upon opposite sides with guide-ribs $B^2$ which ribs fit in and slide in suitable vertical guides $B^3$. The receptacle is also provided with a bail $B^4$ to which is connected a suitable cable C. The valve $A^2$, is of the rotatable type and when the device is applied as shown in Fig. 1, it is provided with a depending valve stem $A^4$ and the cable C passes over two suitable pulleys C' spaced apart and between said pulleys the cable carries a ring or link $C^2$, which is engaged by the lower portion of the valve stem $A^4$. A suitable weight D is secured to the end of the cable opposite the bail $B^4$.

The operation of the device is very simple and will be readily understood as it will be obvious that when the receptacle B contains a sufficient amount of water to overweight the weight D, the receptacle B will rest upon the platform B' and the link $C^2$ will be in such a position as to hold the valve $A^2$ closed. When, however, the amount of water in the receptacle B is reduced, as for example, by its use by the stock, the weight D will over-balance the weight of the receptacle B and the water which may remain therein and the receptacle will be lifted vertically by the downward fall of the weight D. This will cause the link $C^2$ to travel away from one of the pulleys C' toward the other and will swing the valve stem $A^4$ and open the valve and a fresh supply of water will be discharged into the receptacle B. As soon as the predetermined amount has been discharged the receptacle B will over-balance the weight D and will descend to the platform B' and in so doing will automatically return the valve stem $A^4$ to its original position and cut off the supply of water.

In Figs. 5, 6, 7 and 8 I have shown the same invention applied to a slightly different use and in this E represents a suitable casing within which is arranged a vertically movable receptacle F adapted to receive water or other suitable liquid and corresponding to the receptacle B. The receptacle F is provided with a conical valve seat F' which projects downwardly through the bottom of the casing E, which bottom corresponds to the platform B' in Fig. 1. The bottom of the casing E is provided with a suitable opening E' through which the said valve seat projects and this opening is of slightly greater diameter than the valve seat and a drain or discharge pipe G is secured to the bottom of the casing E adapted to receive any liquid which may be discharged through the valve seat F' or which may flow around the sides of said valve seat through the opening E', in the event of the receptacle F at any time over-flowing or leaking. A suitable cone valve F² is adapted to seat itself within the valve seat F and close the discharge opening from the receptacle F and upon the casing E is pivoted between its ends a lever H provided with chains H' and H², the former of which is connected to the valve F² while the latter depends downwardly within reach of the operator. Upon the casing E is also mounted two small sprocket wheels J, which correspond to the pulleys C' of Figs. 1 and 4 and between the said sprocket wheels is arranged a larger sprocket wheel J'. A sprocket chain J² is connected to a suitable bail F³ carried by the receptacle F, and the chain J² runs over the sprocket wheels J and J' and at its free end carries a weight J³, corresponding to the weight D. A suitable supply pipe K, is provided with a valve A² as is the case with the supply pipe A and this valve is provided with a valve stem A⁴ which stem forms the shaft upon which the sprocket wheel J' is fixed.

It will be obvious that the operation of the device in the form last described is substantially the same as in the first described form. When the chain H² is pulled downwardly the valve F² is lifted from its seat and the water is discharged from the receptacle F. The weight J³ lifts the said receptacle vertically causing the sprocket chain J² to rotate the sprocket wheel J' and thus rotate the valve A² in the supply pipe K, in exactly the same manner as the valve was operated in the pipe A, opening the said valve and admitting the fresh supply of water to the receptacle F. When the receptacle descends to its normal position, the sprocket wheel J' is rotated in the reverse direction and the valve is closed and the water supply shut off.

It will be obvious that the pulleys C' and the link C² could be employed in connection with the casing E if desired, and it will also be obvious that the sprocket wheels J and J' and the chain J², could be readily substituted in Fig. 1 for the pulleys C' and the link C². I therefore consider these parts as equivalents of each other, the form shown in Figs. 1 and 4 being preferable where a cheaper construction is desired. It will also be obvious that other uses may be found for the construction above described, as it would require only a slight enlargement of the pipes to convert the invention into a device for automatically feeding grain or similar materials to a stock trough or the like.

Having thus fully described my invention, what I claim as new and desire to secure by Letters Patent, is:—

1. A device of the kind described comprising a receptacle vertically arranged guides between which said receptacle moves, a platform for supporting the receptacle, a supply pipe discharging into the receptacle, a rotatable valve having a handle, said valve controlling said supply pipe, pulleys arranged adjacent said valve handle, a cable having a link therein running over said pulleys, the valve handle being in engagement with said link, and a weight connected to one end of the cable, the other end of the cable being attached to the receptacle.

2. The combination with a supply pipe having a valve therein, a receptacle adapted to receive a liquid from said supply pipe, said receptacle being vertically movable, a plurality of wheels spaced apart, and adjacent the valve in the pipe, a cable connected at one end to the receptacle and at the opposite end to a weight and running over said wheels, and a valve stem arranged between the said wheels and adapted to be moved by the said cable as and for the purpose set forth.

VAN WYCK A. CROSHIER.

Witnesses:
  JOHN F. REDMOND,
  A. F. DICKSON.